United States Patent
Ellison et al.

(10) Patent No.: US 9,930,076 B2
(45) Date of Patent: Mar. 27, 2018

(54) CENTRAL CONFERENCING ROUTING SERVER

(71) Applicant: Level 3 Communications, LLC, Broomfield, CO (US)

(72) Inventors: Gregory Thomas Ellison, Erie, CO (US); Andrew James Broadworth, Thornton, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

(21) Appl. No.: 15/369,440

(22) Filed: Dec. 5, 2016

(65) Prior Publication Data

US 2017/0180431 A1   Jun. 22, 2017

Related U.S. Application Data

(63) Continuation of application No. 14/887,159, filed on Oct. 19, 2015, now Pat. No. 9,516,076, which is a
(Continued)

(51) Int. Cl.
| | |
|---|---|
| *H04L 29/06* | (2006.01) |
| *H04L 12/18* | (2006.01) |
| *H04L 12/801* | (2013.01) |
| *H04M 3/56* | (2006.01) |
| *H04L 29/08* | (2006.01) |
| *H04L 12/24* | (2006.01) |

(Continued)

(52) U.S. Cl.
CPC .......... *H04L 65/1069* (2013.01); *H04L 12/18* (2013.01); *H04L 12/1818* (2013.01); *H04L 41/0668* (2013.01); *H04L 43/0876* (2013.01); *H04L 47/15* (2013.01); *H04L 61/2007* (2013.01); *H04L 65/1006* (2013.01); *H04L 65/403* (2013.01); *H04L 65/80* (2013.01); *H04L 67/18* (2013.01); *H04M 3/56* (2013.01)

(58) Field of Classification Search
CPC . H04L 65/1069; H04L 65/80; H04L 43/0876; H04L 41/0668; H04L 61/2007; H04L 67/18; H04L 65/1006; H04L 12/1818; H04L 65/403; H04L 12/18; H04L 47/15; H04M 3/56

See application file for complete search history.

(56) References Cited

U.S. PATENT DOCUMENTS

| | | | |
|---|---|---|---|
| 5,280,583 | A | 1/1994 | Nakayama et al. |
| 5,623,603 | A | 4/1997 | Jiang et al. |

(Continued)

FOREIGN PATENT DOCUMENTS

| | | |
|---|---|---|
| EP | 2053869 A1 | 4/2009 |
| WO | WO-2007040931 A1 | 4/2007 |

OTHER PUBLICATIONS

European Examination Report, dated Jul. 6, 2016, Application No. 12860103.6, filed Dec. 20, 2012; 7 pgs.

(Continued)

*Primary Examiner* — Thai Nguyen

(57) ABSTRACT

Aspects of the present disclosure involve systems, methods, computer program products, and the like, for collaboration conferencing with multiple participants over a communications network, and more specifically for a conferencing routing service for managing and routing collaboration participants.

20 Claims, 6 Drawing Sheets

Related U.S. Application Data continuation of application No. 13/708,636, filed on Dec. 7, 2012, now Pat. No. 9,167,010.

(60) Provisional application No. 61/578,794, filed on Dec. 21, 2011, provisional application No. 61/578,798, filed on Dec. 21, 2011, provisional application No. 61/578,803, filed on Dec. 21, 2011, provisional application No. 61/578,807, filed on Dec. 21, 2011, provisional application No. 61/578,810, filed on Dec. 21, 2011, provisional application No. 61/584,115, filed on Jan. 6, 2012, provisional application No. 61/584,122, filed on Jan. 6, 2012.

(51) Int. Cl.
*H04L 29/12* (2006.01)
*H04L 12/26* (2006.01)

(56) References Cited

U.S. PATENT DOCUMENTS

| | | | |
|---|---|---|---|
| 5,825,858 | A | 10/1998 | Shaffer et al. |
| 5,828,743 | A | 10/1998 | Pinnell |
| 5,978,463 | A | 11/1999 | Jurkevics |
| 6,411,605 | B1 | 6/2002 | Vance et al. |
| 6,553,413 | B1 | 4/2003 | Leighton et al. |
| 6,564,261 | B1 | 5/2003 | Gudjonsson et al. |
| 6,646,997 | B1 | 11/2003 | Baxley et al. |
| 6,657,975 | B1 | 12/2003 | Baxley et al. |
| 6,671,717 | B1 | 12/2003 | Shaffer |
| 6,782,413 | B1 | 8/2004 | Loveland |
| 6,879,565 | B2 | 4/2005 | Baxley et al. |
| 6,885,740 | B2 | 4/2005 | Ernstrom et al. |
| 6,898,273 | B2 | 5/2005 | Ernstrom et al. |
| 6,961,416 | B1 | 11/2005 | Summers et al. |
| 7,054,933 | B2 | 5/2006 | Baxley et al. |
| 7,394,896 | B2 | 7/2008 | Norton |
| 7,460,493 | B1 | 12/2008 | Dhanoa et al. |
| 7,778,206 | B2 | 8/2010 | Shaffer et al. |
| 7,889,660 | B2 | 2/2011 | Bugenhagen |
| 8,060,563 | B2 | 11/2011 | Whynot et al. |
| 8,068,425 | B2 | 11/2011 | Bugenhagen |
| 8,189,468 | B2 | 5/2012 | Bugenhagen |
| 8,194,643 | B2 | 6/2012 | Bugenhagen |
| 8,229,096 | B1 | 7/2012 | Marquis et al. |
| 8,289,965 | B2 | 10/2012 | Bugenhagen et al. |
| 8,340,083 | B2 | 12/2012 | Bugenhagen et al. |
| 8,364,133 | B1 | 1/2013 | Lucey et al. |
| 8,428,634 | B2 | 4/2013 | Schwagmann et al. |
| 8,467,354 | B1 | 6/2013 | Jerkunica |
| 8,665,758 | B1 | 3/2014 | Mateer |
| 8,666,056 | B2 | 3/2014 | Makagon et al. |
| 8,737,596 | B2 | 5/2014 | Kelley et al. |
| 8,774,383 | B1 | 7/2014 | Marquis et al. |
| 8,798,251 | B2 | 8/2014 | Rajagopalan et al. |
| 2001/0002927 | A1 | 6/2001 | Detampel, Jr. et al. |
| 2002/0075304 | A1 | 6/2002 | Thompson et al. |
| 2002/0076025 | A1 | 6/2002 | Liversidge et al. |
| 2002/0172341 | A1* | 11/2002 | Wellner ............... H04M 3/562 379/202.01 |
| 2003/0023672 | A1 | 1/2003 | Vaysman |
| 2003/0156697 | A1 | 8/2003 | Svercek |
| 2003/0217174 | A1 | 11/2003 | Dorenbosch et al. |
| 2004/0047460 | A1 | 3/2004 | Adams et al. |
| 2004/0170266 | A1 | 9/2004 | Adams et al. |
| 2004/0246332 | A1 | 12/2004 | Crouch |
| 2005/0034079 | A1 | 2/2005 | Gunasekar |
| 2005/0058125 | A1 | 3/2005 | Mutikainen et al. |
| 2005/0213517 | A1 | 9/2005 | Rodman et al. |
| 2007/0217589 | A1 | 9/2007 | Martin et al. |
| 2007/0248022 | A1 | 10/2007 | Kumar et al. |
| 2007/0266077 | A1 | 11/2007 | Wengrovitz |
| 2008/0031437 | A1 | 2/2008 | Rey |
| 2008/0049753 | A1 | 2/2008 | Heinze et al. |
| 2008/0063173 | A1 | 3/2008 | Sarkar et al. |
| 2008/0159179 | A1 | 7/2008 | Shaffer |
| 2008/0218586 | A1 | 9/2008 | Graham et al. |
| 2008/0253549 | A1 | 10/2008 | Loveland |
| 2009/0019367 | A1 | 1/2009 | Cavagnari et al. |
| 2010/0124321 | A1 | 5/2010 | Alexandrov et al. |
| 2010/0165889 | A1* | 7/2010 | Madabhushi ....... H04M 3/2227 370/261 |
| 2010/0169418 | A1 | 7/2010 | Whynot et al. |
| 2010/0275134 | A1 | 10/2010 | Baker et al. |
| 2012/0117153 | A1 | 5/2012 | Gunasekar |
| 2013/0162756 | A1 | 6/2013 | Ellison et al. |
| 2013/0163409 | A1 | 6/2013 | Ellison et al. |
| 2013/0163435 | A1 | 6/2013 | Ellison et al. |
| 2013/0163481 | A1 | 6/2013 | Ellison et al. |
| 2013/0173706 | A1 | 7/2013 | Broadworth et al. |
| 2013/0335513 | A1 | 12/2013 | Broadworth et al. |
| 2013/0336170 | A1 | 12/2013 | Broadworth et al. |
| 2016/0044068 | A1 | 2/2016 | Ellison et al. |
| 2016/0050078 | A1 | 2/2016 | Ellison et al. |
| 2016/0053997 | A1 | 2/2016 | Broadworth et al. |
| 2016/0057183 | A1 | 2/2016 | Broadworth et al. |
| 2016/0285726 | A1 | 9/2016 | Ellison et al. |
| 2017/0295092 | A1 | 10/2017 | Broadworth et al. |

OTHER PUBLICATIONS

European Examination Report, dated Jul. 7, 2016, Application No. 13733754.9, filed Jan. 4, 2013; 4 pgs.
Extended European Search Report, dated May 18, 2015, Application No. 12860103.6, filed Dec. 20, 2012; 10 pgs.
Extended European Search Report, dated May 18, 2015, Application No. 13733754.9, filed Jan. 4, 2013; 10 pgs.
International Preliminary Report on Patentability, dated Jul. 8, 2014, Int'l Appl. No. PCT/US13/020244, Int'l Filing Date Jul. 8, 2014; 18 pgs.
International Preliminary Report on Patentability, dated Jun. 24, 2014, Int'l Appl. No. PCT/US12/071018, Int'l Filing Date Dec. 20, 2012; 8 pgs.
International Search Report, dated Apr. 23, 2013, Int'l Appl. No. PCT/US13/020244, Int'l Filing Date Jan. 4, 2013, 5 pgs.
International Search Report, dated Mar. 19, 2013, Int'l Appl. No. PCT/US12/071018, Int'l Filing Date Dec. 20, 2012; 3 pgs.
"Telecommunications and Internet Converged Services and Protocols for Advanced Networking (TISPAN)", Release 2;PSTN/ISDN simulation services: Conference (CONF); Protocol specification;13bTD300 WI03083 Discussion of 3PTY, ETSI Draft; European Telecommuniocations Standards Institute (ETSI), 650, Route des Lucioles; F-06921 Sophia-Antipolis; France; Mar. 20, 2007 , vol. zArchive, No. V0.0.3, pp. 1-20.
Written Opinion of the International Searching Authority, dated Apr. 23, 2013, Int'l Appl. No. PCT/US13/020244, Int'l Filing Date Jan. 4, 2013, 16 pgs.
Written Opinion of the International Searching Authority, dated Mar. 19, 2013, Int'l Appl. No. PCT/US12/071018, Int'l Filing Date Dec. 20, 2012, 5 pgs.
Colbert, Raymond O. et al., "Advanced Services: Changing How We Communicate", *In: Bell Labs Technical Journal* [online], [retrieved on Feb. 11, 2013 (Feb. 11, 2013)] Retrieved from the Internet <URL: http://www.herbsleb.org/web-pubs/pdfs/colbert-advanced-2001.pdf>, entire document Jun. 2001 , pp. 211-228.
European Examination Report, dated May 10, 2017, Application No. 12860103.6, filed Dec. 20, 2012; 10 pgs.

* cited by examiner

US 9,930,076 B2

CENTRAL CONFERENCING ROUTING SERVER

CROSS-REFERENCE TO RELATED APPLICATIONS

This application is a continuation of and claims the benefit of priority to U.S. Non-Provisional application Ser. No. 14/887,159 titled "CENTRAL CONFERENCING ROUTING SERVER," filed on Oct. 19, 2015, and is hereby incorporated by reference herein for all purposes. Application Ser. No. 14/887,159 is a continuation of and claims the benefit of priority to U.S. Non-Provisional application Ser. No. 13/708,636 titled "CENTRAL CONFERENCING ROUTING SERVER," filed on Dec. 7, 2012, and is hereby incorporated by reference herein for all purposes. Application Ser. No. 13/708,636 claims priority under 35 U.S.C. § 119(e) to provisional patent application No. 61/584,115 titled "CENTRAL CONFERENCING ROUTING SERVICE" and provisional patent application 61/584,122 titled "CENTRAL CONFERENCING ROUTING SERVICE," both filed on Jan. 6, 2012 and both of which are hereby incorporated by reference herein for all purposes. Application Ser. No. 13/708,636 claims priority under 35 U.S.C. § 119(e) to U.S. Provisional Application No. 61/578,794 entitled "SIP-BASED VOIP COLLABORATION", U.S. Provisional Application No. 61/578,798 entitled "SIP-BASED VOIP COLLABORATION", U.S. Provisional Application No. 61/578,803 entitled "SIP-BASED VOIP COLLABORATION", U.S. Provisional Application No. 61/578,807 entitled "SIP-BASED VOIP COLLABORATION" and U.S. Provisional Application No. 61/578,810 entitled "SIP-BASED VOIP COLLABORATION" all filed on Dec. 21, 2011 and each of which is incorporated by reference in their entirety herein for all purposes. In addition, this application is related to co-owned U.S. Non-Provisional patent application Ser. No. 13/708,659 titled "METHOD FOR ROUTING IN A CENTRAL CONFERENCE ROUTING SERVER,", co-owned U.S. Non-Provisional patent application Ser. No. 13/708,678 titled "LOAD BALANCING IN A CENTRAL CONFERENCING ROUTING SERVER," and co-owned U.S. Non-Provisional patent application Ser. No. 13/708,689 titled "DISASTER RECOVERY WITH A CENTRAL CONFERENCING ROUTING SERVER,", each of which is hereby incorporated by reference herein for all purposes.

TECHNICAL FIELD

Aspects of the present disclosure generally relate to systems and methods that provide for collaboration conferencing with multiple participants using devices connected to a telecommunication network, including a VoIP network, and more specifically for a conferencing routing service for managing and routing collaboration participants.

BACKGROUND

Telecommunication networks provide for the transmission of information across some distance through terrestrial, wireless or satellite communication networks. Such communications may involve voice, data or multimedia information, among others. In addition, telecommunication networks often offer features and/or services to the customers of the network that provide flexible and varied ways in which the communications are transmitted over the network. For example, some telecommunication networks provide a conferencing feature that allows several users of the network to communicate at once, rather than a simple person-to-person communication. The number of participants to a conference communication may range from several users to several thousand users communicating on the same telephonic, video and/or data call.

Typically, conferencing communications require participants to the conference to place a telephonic call to a dedicated conferencing number. Some networks also require the participants enter a conference call code into the keypad of a telephonic device. The conferencing number and code are then utilized by the telecommunications network to connect that participant to a conference bridge device. In general, a conference bridge is a telecommunications device that hosts the participants of a conferencing communication such that the participants can participate in a conference call. Thus, the network typically receives the dialed number and conference code from each participant and connects the participant to the conference bridge. Once connected to the conference bridge, the participant may take part in the conference. To ensure that each of the participants of the conference may take part in the communication, each participant must connect to the same conference bridge.

It is with these and other issues in mind, among others, that various aspects of the present disclosure were conceived and developed.

SUMMARY

One implementation of the present disclosure may take the form of a method for routing one or more collaboration conference access requests. The method may include the operations of receiving a collaboration conference access request from a requester's telephonic device and associating an identification number with the collaboration conference access request, the identification number associated with a customer of a telecommunications network. Based on the collaboration conference access request and identification number, a hosting conference bridge from a plurality of conference bridges associated with the telecommunications network and configured to host a collaboration conference is selected. In addition, the method may include the operation of transmitting one or more routing messages to the telecommunications network, wherein the one or more routing messages include an indication of the selected conference bridge.

Another implementation of the present disclosure may take the form of a system for selecting a conference bridge associated with a network for hosting a collaboration conference event. The system may include a network interface unit configured to receive a communication from a user of a communications network to establish a collaboration conference on the network, a processing device in communication with the network interface unit and a computer-readable medium connected to the processing device configured to store information and instructions. The instructions, when executed by the processing device, cause the system to perform the operations of transmitting one or more requests for performance information from one or more conference bridges associated with the network, analyzing the performance information from the one or more conference bridges associated with the network and selecting one of the one or more conference bridges associated with the network for hosting the conference event based at least on the performance information.

Yet another implementation of the present disclosure may take the form of a method for hosting a collaboration conference access requests. The method may include the operations of receiving a collaboration conference access request from a requester's telephonic device, the request comprising a requester identification and an access code, associating a conference identification number with the requester identification and an access code of the collaboration conference access request and selecting a hosting conference bridge from a plurality of conference bridges associated with the telecommunications network and configured to host a collaboration conference, wherein the hosting conference bridge is a session initiation protocol (SIP) based telecommunication device. In addition, the method may include the operations of transmitting a SIP-based request message to the selected hosting conference bridge, wherein the SIP-based request message comprises at least the conference identification number and transmitting one or more SIP refer routing messages to the telecommunications network, wherein the one or more routing messages comprises at least an internet protocol (IP) address of the selected hosting conference bridge.

DETAILED DESCRIPTION

Aspects of the present disclosure involve systems, methods, computer program products, and the like, for collaboration conferencing with multiple participants over a communications network, and more specifically for a conferencing routing server for managing and routing collaboration participants. Collaboration conferencing as used herein comprises any type of multimedia conferencing over a network, such as audio conferencing, web or internet conferencing and multi-site video conferencing. One example of a central conferencing routing server (CCRS) is implemented and configured in the communications network to receive a request to join a collaboration conference from one or more of the participants and route the participants to a shared communication bridge that conducts the conference. Additionally, the CCRS may receive and maintain information about the communications network to intelligently route the collaboration conference to an appropriate bridge based on any number of criteria. For example, the CCRS may communicate with one or more conference bridges associated with the communications network and determine which conference bridge will host a collaboration conference request from a collaboration participant.

The CCRS may also determine which conference bridge will host a collaboration conference request based on other information. For example, the CCRS may maintain a database of information or preferences associated with the conference requester and attempt to select a conference bridge based on the requester's information. Such information may include, but is not limited to, a regional preference, the size of the collaboration request and certain collaboration features of the conference collaboration. In another example, the CCRS may receive performance information from a plurality of conference bridges that are able to conduct the collaboration conference and select a conference bridge in response to the performance information. For example, a particular bridge may provide certain additional features, such as high definition audio, and the selection of the conference bridge may be based on the desire for the additional feature or features. Also, the CCRS may be configured to respond to a failure in one of the conference bridges to allow for repair to the network and/or account for split conferences that may occur due to the bridge failure. In general, the CCRS may provide configurability in routing a collaboration conference to a conference bridge based on any number of criteria and information about the requester and the communications network on which the conference occurs.

Figure 1:
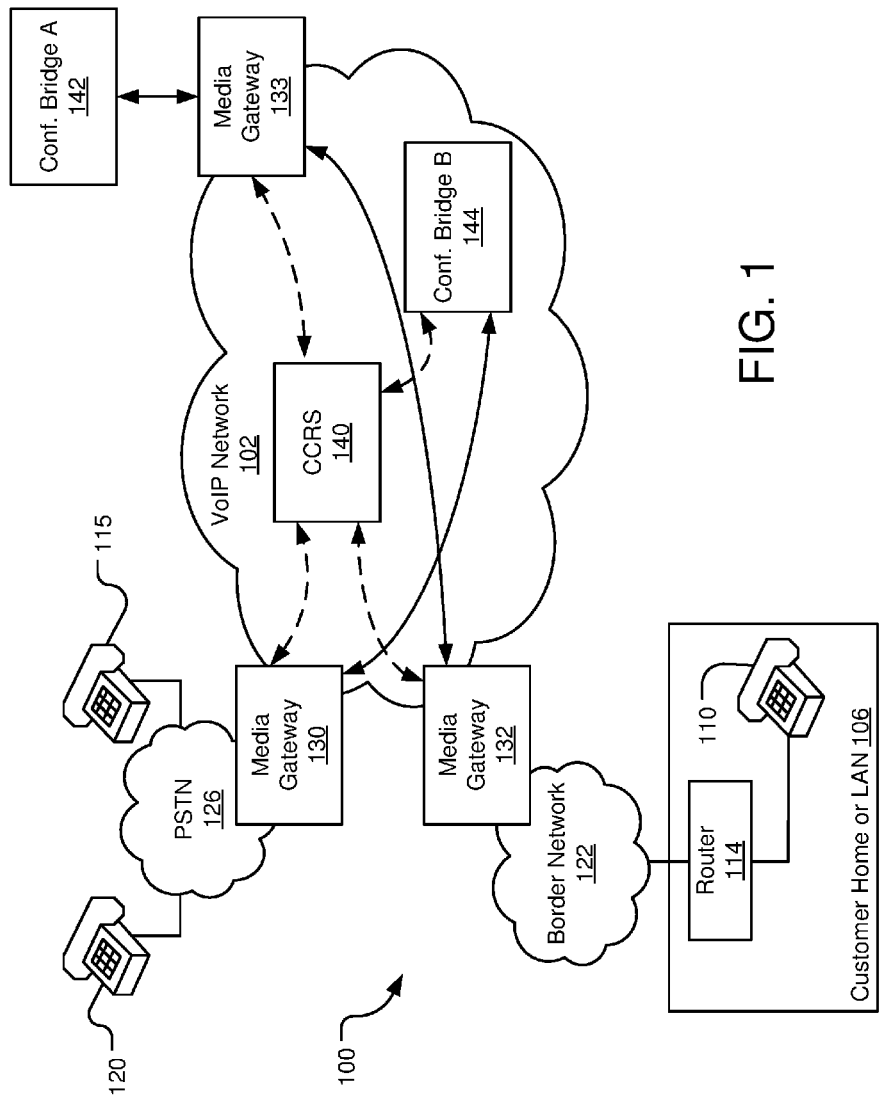
FIG. 1 schematic diagram illustrating an exemplary Voice over Internet Protocol (VoIP) operating environment, including a central conferencing routing server, in accordance with one embodiment.

FIG. 1 illustrates an exemplary operating environment 100 for hosting conference collaboration communications between multiple participants. The environment 100 provides for setting up communication sessions between network users. With specific reference to FIG. 1, the environment 100 includes a VoIP network 102, which may be provided by a wholesale network service provider. However, while the environment 100 of FIG. 1 shows a configuration using the VoIP network 102, it should be appreciated that any communication network is envisioned as included in the operating environment 100. For example, network 102 may be a circuit switch communication network utilizing time division multiplexing (TDM) or plain old telephone service (POTS) switching. In general, the network 102 of FIG. 1 may be any communication network known or hereafter developed. However, for ease of understanding, a VoIP network embodiment is hereafter used to describe the communications network.

The VoIP network 102 includes numerous components such as, but not limited to gateways, routers, and registrars, which enable communication across the VoIP network 102, but are not shown or described in detail here because those skilled in the art will readily understand these components. More relevant to this description is the interaction and communication between the VoIP network 102 and other entities, such as the one or more customer home or business local area networks (LANs) 106, where a participant in a conference will connect with the system for the conference.

Customer network 106 can include communication devices such as, but not limited to, a personal computer or a telephone 110 connected to a router/firewall 114. Although shown in FIG. 1 as telephonic devices 110, the communication devices may include any type of communication device that receives a multimedia signal, such as an audio, video or web-based signal, and presents that signal for use by a user of the communication device. The communication and networking components of the customer network 106 enable a user at the customer network 106 to communicate via the VoIP network 102 to other communication devices, such as another customer network and/or an analog telephone 115, 120. Components of the customer network 106 are typically home-based or business-based, but they can be relocated and may be designed for easy portability. For example, the communication device 110 may be wireless (e.g., cellular) telephone or portable laptop computer.

The customer network 106 typically connects to the VoIP network 102 via a border network 122, such as one provided by an Internet Service Provider (ISP). The border network 122 is typically provided and maintained by a business or organization such as a local telephone company or cable company. The border network 122 may provide network/communication-related services to their customers. In contrast, the communication device 120 accesses, and is accessed by, the VoIP network 102 via a public switched telephone network (PSTN) 126 operated by a local exchange carrier (LEC). Communication via any of the networks can be wired, wireless, or any combination thereof. Additionally, the border network 122 and PSTN 126 may communicate, in some embodiments, with the VoIP Network 102 through a media gateway device (130, 132). For ease of instruction, only three communication devices 110, 115, 120 are shown communicating with the VoIP network 102; however, numerous such devices, and other devices, may be connected with the network, which is equipped to handle enormous numbers of simultaneous calls and other communications.

In general, a request for a collaboration conference over the VoIP network 102 is initiated by a requester through one of the communication devices 110, 115, 120 associated with the network. As used herein, the term "collaboration conference" includes any type of collaboration between three or more users of a communication network. For example, the collaboration conference may include audio collaboration, video collaboration, web collaboration, a combination of any of the above, and the like. For ease of instruction, the collaboration conferences discussed herein are generally made in reference to an audio conference, although any type of collaboration conference over a telecommunications network is envisioned with respect to the present disclosure. Similarly, although FIG. 1 illustrates the communication devices 110, 115, 120 as telephonic devices, the communication devices may be any type of communication device, including personal computers, cellular phones and the like.

Upon receipt of the request for a collaboration conference, the network 102 routes the request to the CCRS 140, integrated within the network 102. However, it should be appreciated that the CCRS 140 may be a part of the network 102, may be separate from the network, or may have portions deployed in the network and out of the network. In addition, the CCRS 140 may be resident on one or more components of the VoIP network 140, including several instances of the CCRS 140 integrated throughout the network 140. Further, although only a single instance of a CCRS 140 is illustrated in FIG. 1, any number of CCRS instances may be present in the network 102 to form a CCRS system. As discussed in more detail below, the network 102 may account for the availability of multiple CCRS devices or instances through a process of establishing a master CCRS control engine.

To transmit the request to the network, the requester uses the communication device 110, 115, 120 to dial a conference specific telephone number. In some instances, the network, upon receipt of the dialed communication, executes an application that queries the requester to enter an access code number that the requester enters into the communication device 110, 115, 120. With this information, the network 102 determines that the requester intends to initiate or join a collaboration conference and routes the request to a conference bridge, as explained in greater detail below.

In any event, the CCRS 140 receives the request to begin a collaboration conference or join an existing conference. In response, and described in more detail below, the CCRS 140 may route the one or more requests to one of several conference bridges 142, 144 associated with the VoIP network 102 for hosting of the collaboration conference. Although only two conference bridges 142, 144 are shown in FIG. 1, it should be appreciated that any number of conference bridges may be associated with the network 102 for hosting collaboration conferences.

In general, the conference bridges 142, 144 provide a hosting site for a collaboration conference between a plurality of users of the network 102. Thus, the conference bridge A 142 may host a collaboration conference while the conference bridge B 144 may host an additional collaboration conference. In particular, the conference bridge A 142 is connected to the communications network 102 through a media gateway 133 similar to the media gateway disclosed above. This configuration may be utilized when the conference bridge 142 is a time division multiplex (TDM) bridge. Conference bridge B 144 is internal to the communications network 102 through which the communications of the conference are transmitted. This configuration is utilized for Internet Protocol (IP) based bridges.

Additionally, the CCRS 140 may be configured for use with any number of network and conference bridge platforms. For example, the telecommunications network 102 of FIG. 1 may be configured as a TDM network or an IP-based network, which includes video, audio and web-based components, to which the CCRS 140 may be configured to interface. Another particular network and/or conference bridge platform supported by the network configuration 102 of FIG. 1 is a Session Initiation Protocol (SIP) based network. For example, the conference bridge B 144 may be a SIP-based conference bridge. Such IP-based components may provide additional conferencing features to the network by providing information concerning the collaboration conference in a header of a message transmitted through the network such as an identification of the collaboration conference, video integration, Uniform Resource Identifier (URI) based routing and conference integration, conference access credentials for authentication and permission to enter the requested conference. SIP-based conference bridges may also provide high definition audio, additional security features and transitions between collaboration conferences without having to redial into the system. In general, because components operating utilizing SIP can exchange information within a header, many additional features for a collaboration conference can be offered to participants on a SIP-based conference bridge. In addition, SIP-based CCRS devices may utilize many of the advantages of information exchange within the header when communicating with TDM-based network devices.

To connect to a collaboration conference, each participant to the conference may be routed to the same conference bridge 142, 144 for the duration of the conference. The conference bridge 142, 144, in turn, provides communication ports for each participant such that each participant can hear or otherwise participate in the collaboration conference. Any conference bridge known in the art or hereafter developed may be integrated into the system 100 of FIG. 1 for hosting a collaboration conference. In addition, the term "conference bridge" or "bridge" includes any component of a communication network that provides an access point to one or more users of the network for a collaboration conference. For example, a "conference bridge" may also include such devices as a media server device, a gateway server device or the like as configured within the network 102.

Figure 2:
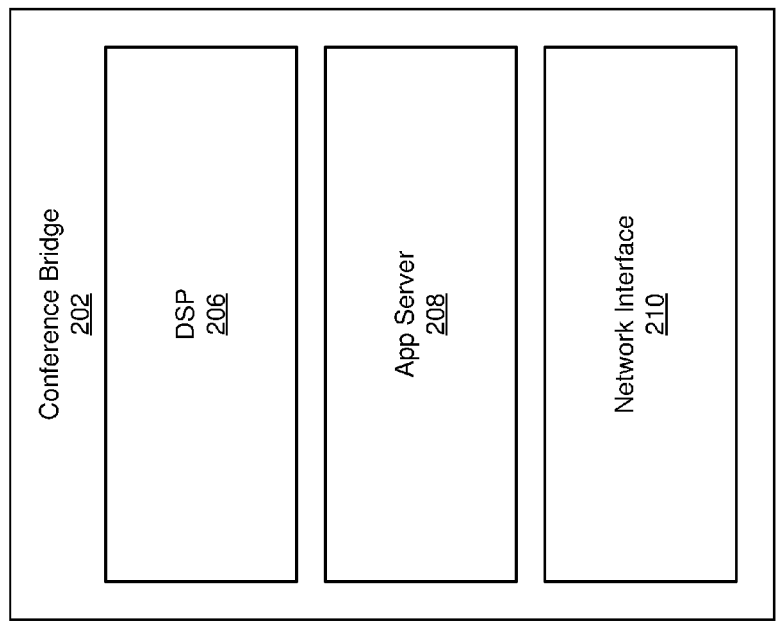
FIG. 2 is a block diagram illustrating a conference bridge configured to host one or more conferencing communications.

FIG. 2 is a block diagram illustrating an exemplary conference bridge device that may be utilized in the network configuration 100 of FIG. 1. The conference bridge 202 comprises an application server 208 and a digital signal processing (DSP) component 206. In general, the application server 208 of the conference bridge 204 communicates with one or more applications of the network to establish the collaboration conference. In addition, for SIP-based or other IP-based conference bridges, the bridge may include a network interface unit 210. In general, the application server 208 includes one or more applications that can be executed by the conference bridge 202 to perform many of the functions described herein for the conference bridge. In addition, the conference bridge 202 may include a network interface unit 210 for receiving information and/or instructions from the network 202 to route and connect a collaboration conference communication for that particular bridge. The network interface unit 210 connects to the media gateway 133 of FIG. 1 or connects directly to the core of the network 100 to receive the communications of the participants and connects each participant to each other to establish the collaboration conference. The network interface unit 210 may also initiate one or more of the applications stored in the application server for execution by the conference bridge. In general, the conference bridge 202 may receive a request from the network to connect a requester with a hosted conference. The request may be received through a signaling protocol, such as through a SIP-based communication. In response, the application server 208 may provision one or more ports for connection to the requester's communication. The app server 208 may then signal to the network 102 that the ports are available, at which point the data or audio portion of the communication may be routed to an available port in the conference bridge 202. In this manner, the handshaking between the network and the conference bridge 202 may occur over the signaling plane of the IP-based protocol separate from the data or audio portion of the communication request. A more detailed description of the method through which a request is routed to a conference bridge 202 is included below with reference to FIG. 3.

Figure 3:
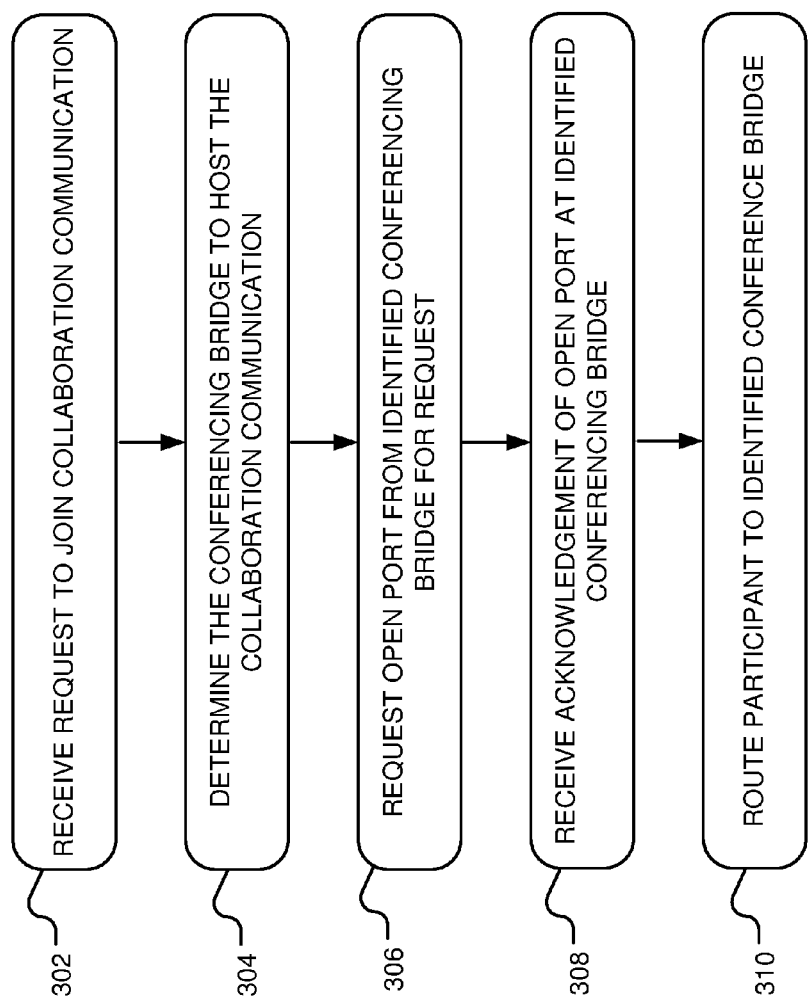
FIG. 3 is a flowchart of a method for the CCRS of the network 102 to receive a request from one or more participants to join a collaboration session and route the participants to the proper conference bridge.

Returning to FIG. 1, the network 100 may be utilized by one or more participants to a collaboration or conferencing communication hosted on a conference bridge 142, 144. In particular, FIG. 3 is a flowchart of a method for the CCRS of the network 102 to receive a request from one or more participants to join a collaboration session and route the participants to the proper conference bridge 142, 144 through which the collaboration is hosted. In general, the operations described in relation to the flowchart of FIG. 3 are performed by one or more components of the CCRS 140 as part of the telecommunications network 102.

Beginning with operation 302, a participant to a conference communication may dial into the conference using a telephonic device 110, 115 and/or 120. In particular, the participant may dial a conference number and/or enter a conference code to access the collaboration conference. The media gateway 130, 132 or other switching device routes the request from the participant to the CCRS 140 through the network 102. In FIG. 1, the request is illustrated by the dashed line between the media gateway 130, 132 and the CCRS 140. As should be appreciated, in some IP networks, the request may be routed to the CCRS 140 on a signaling plane and does not include the audio portion of the communication. The request is then received by the CCRS 140, as indicated by operation 302 of FIG. 3.

Upon receipt, the CCRS 140 determines, in operation 304, which of the available conference bridges 142, 144 associated with the network 102 that is hosting or will host the collaboration conference requested by the participant. The CCRS 140 may utilize several factors to determine which conference bridge 142, 144 hosts the collaboration conference. Such factors and operations performed by the CCRS 140 to determine the appropriate conference bridge are discussed in more detail below. In addition, the CCRS 140 may communicate with one or more of the conference bridges 142, 144 associated with the network 102 in operation 304. This communication between the CCRS 140 and the conference bridges is illustrated by the dashed lines between the CCRS and the conference bridges in FIG. 1. Further, in the embodiment in which the conference bridge 142, 144 is within the network 100, the CCRS 140 would communicate directly with the conference bridge without going through the media gateway device 133.

In one embodiment, the CCRS 140 communicates particularly with the app server component 208 of the conference bridge 202 to determine the appropriate collaboration bridge and to establish the collaboration conference. The app server component 208 of the conference bridge 202 may provide any information concerning the conference bridge to the CCRS 140, including number and types of available ports, the technical capabilities of the conference bridge, current collaboration conferences being hosted by the conference bridge, and the like. In another example, the conference bridge 142 may be a SIP-based conference bridge. In this example, the CCRS 140 would communicate with the app server 208 through the network interface unit 210. The app server 208 then provisions the requested ports and notifies the CCRS 140 when such ports are available for the collaboration conference. In addition, the app server 208 provides the information of the conference bridge 142 that may be utilized by the CCRS 140 to determine which conference bridge will host the collaboration conference.

For example, a participant may utilize the telephonic device 120 or other communication device to access the network 100 and request access to a collaboration conference. The media gateway 130 associated with the communication device 120 routes the request to the CCRS 140. In response, the CCRS 140 identifies conference bridge B 144 as the conference bridge which will host or is hosting the collaboration conference. In one embodiment, the CCRS 140 communicates with conference bridge B 144 to determine availability and verify that the collaboration conference is hosted on conference bridge B.

In operation 306, the CCRS 140 requests an open communication port from the conference bridge 142 identified in operation 302. In the embodiment shown in FIG. 2, the conference bridge 202 may utilize a port in the DSP component 206 of the conference bridge in response to the request sent by the CCRS 140. The open port in the DSP component 206 allows the participant to connect to the collaboration conference hosted by the conference bridge 202 and participate in the conference. In addition, the conference bridge 202 may transmit an acknowledgement to the CCRS 140 from which the request originated to indicate that the requested communication is open. Again, in IP-based networks, the request for available ports and acknowledgement may occur on a separate communication signal than the audio or video portion of the collaboration communication. Further, a SIP-based network, the request may include certain information in the header of the request, such as the master ID number and/or the number of requested ports. The request made by the CCRS 140 to the conference bridge is illustrated in FIG. 1 as the dashed line from the CCRS to the media gateways associated with each conference bridge.

In operation 308, the CCRS 140 receives the acknowledgement message from the conference bridge 142. In one embodiment, the acknowledgement message contains information that identifies the open port to the CCRS 140. For example, in the SIP-based embodiment, the acknowledgment may include the IP address of the conference bridge in the header of the message. In response to receiving the acknowledgement message, the CCRS 140 routes the participant's communication to the open port in the conferencing bridge 142 in operation 310. In one embodiment, the CCRS 140 facilitates the communication to the conference bridge 142 such that the audio portion of the communication from the participant is no longer routed through the CCRS. For example, in a network 102 that utilizes Session Initiation Protocol (SIP), the CCRS 140 may issue a "SIP Refer" command to the media gateway 133 in operation 310 to route the participant communication to the conference bridge 142, effectively removing the CCRS from the communication flow. This refer message may include the IP address of the selected conference bridge in the header such that the network can route the communication to the selected conference bridge. The connection of the communication bypassing the CCRS is illustrated in FIG. 1 as the solid line connecting the media gateway 133 associated with the participant's telephonic device 120 and the media gateway associated with conference bridge A 142. Thus, through the use of the method outlined in FIG. 3, the CCRS 140 may receive a request from a participant of a collaboration conference and route the participant to the proper conference bridge that hosts the specific collaboration conference. In a similar manner, collaboration conference participants may be routed to media gateway 133 and conference bridge A 142 such that multiple conferences may be occurring simultaneously through the network 102 on multiple conferencing bridges 142, 144.

As can be understood in light of the CCRS described above, utilizing a central conferencing server provides several advantages over previous conferencing systems. As mentioned, prior art conferencing systems statically connected each participant to a conferencing bridge based on the number assigned to the participant. Thus, such networks had no mechanism for adjusting the load on any one conferencing bridge based on the number of conference participants. In addition, such systems proved difficult in determining proper billing rates for the collaboration conference as each participant could be requesting access to the conference from any place on the globe, without any central mechanism for determining the location of each participant.

In contrast, the CCRS of the present disclosure provides flexibility in the routing and handling of the collaboration conferences. For example, because each participant request is directed to the CCRS, handling of the participant request is easier on the communications network as the termination point for each request is the same component of the network. In particular, by including a component of the network that is dedicated to handling all requests for a conference participation, other components in the network that were previously tasked with receiving and routing the request may be freed to handle other type of network traffic. In addition, the CCRS provides protection against unintended overloading of a conference bridge. For example, a very large company with several thousand employees may utilize the communication network for collaboration conferences. However, because collaboration conference numbers are typically directly associated to a dedicated conference bridge for that number, too many employees of a particular company attempting to initiate a collaboration conference at the same time may overload a conference bridge that is already hosting several other collaboration conferences. To prevent this, many communication networks may assign several conferencing access numbers to the very large company so that the employees are spread over several conference bridges. However, providing several conferencing access numbers to a single entity may be confusing to the employees of the very large company. In contrast, because the CCRS provides dynamic routing of the conference participants, a single conference access number may be provided to the very large company as the same conference access number may be routed to any one of the available conferencing bridges, rather than the dedicated conference bridge for the number. In this example, even if an inordinate number of employees attempt to initiate collaboration conferences at the same time, the CCRS can route the participants accordingly such that all of the collaboration conferences do not end up on the same conference bridge that may overload the bridge.

In another example, an administrator of a collaboration conference may prefer to include other types of multimedia communications to accompany the voice portion of the collaboration conference. For example, a web page may be provided to an administrator of the conference to provide presentations and/or control over the conference. The web moderator web page provides such control features as the ability to mute all participants, disconnect a particular individual participant, show the number and identification of each participant, and the like. However, such a web page may not be within the capabilities of each conference bridge. Thus, when such features are requested by a moderator of the collaboration conference, it is often advantageous to place the conference on a conference bridge that supports such features. Such routing of a conference to a conference bridge that supports the technical requirements of the collaboration conference can occur dynamically through the use of the CCRS described above. Further examples of dynamic routing advantages gained through the use of a CCRS in the telecommunications network are described below.

Also, a conferencing system that utilizes a CCRS can adapt to varying aspects of the collaboration conference. For example, the CCRS may identify that the participants to a particular collaboration conference are originating from a certain region of the world, based on the telephonic device the requester accesses the network. In this example, the CCRS can route each participant to a conference bridge that is geographically located near the region of the world of each participant to improve the reliability of the conference. Also, the CCRS may aid in the accurate billing of the conference to a customer by providing a central location in which information for each participant to a conference can be retained and retrieved by the telecommunications network. Such information may not be available to a conference bridge that just receives communications from the telecommunications network as the information may be spread over any number of devices in the network.

An additional advantage provided by the CCRS is a more robust and faster disaster recovery during failure of a conference bridge hosting a collaboration conference. In previous conferencing systems, such disaster recovery required a network administrator to reroute each participant to the conference to a new conference bridge, requiring both time and manpower to accomplish. In contrast, the CCRS as described herein may be programmed to identify a failure at a conference bridge and dynamically reroute each participant to a new conference bridge. This rerouting of the participants to a new conference bridge may occur with or without action by a network administrator such that disaster recovery occurs automatically. These advantages and more may be realized through the utilization of a CCRS in a conferencing system provided by a telecommunications network.

Figure 4:
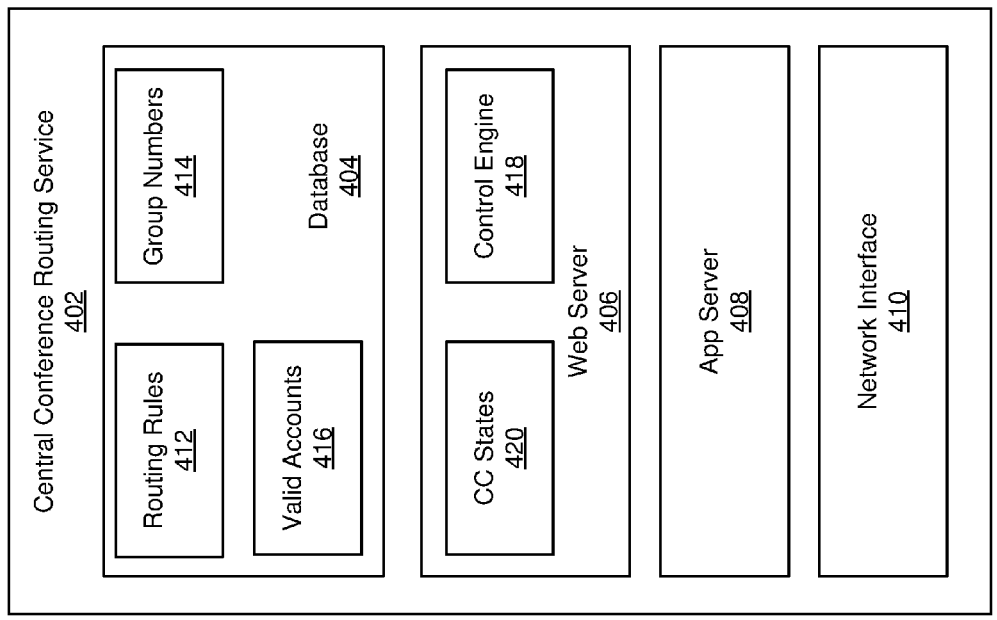
FIG. 4 is a block diagram illustrating several components of a central conferencing routing server.

FIG. 4 is a block diagram illustrating several components of a central conferencing routing server 140 that may be implemented on the network 100 of FIG. 1. The components outlined may be implemented by one or more processors executing one or more computer instructions stored in a computer-readable medium. Examples of systems that may execute or implement the components are provided below with reference to FIG. 5. Also, as mentioned above, the components of the CCRS may be located on any number of computing devices within the network, on any number of computing devices outside of the network, and/or a combination of both.

The CCRS 402 may include a database 404 configured to store information concerning an associated network, one or more customers or users of the network 416, identification numbers 414, and/or any other information useful by the CCRS in routing, billing, load balancing, disaster recover and the like for collaboration conferencing communications. For example, the database 404 may store identification numbers 414 for individuals or groups of users to the network who have access to a collaboration conference feature. Associated with the identification numbers may be one or more telephone numbers, access codes, communication device identifications, master identifications and routing rules associated with the users. The database 404 may also store information associated with the routing 412 and handling of collaboration conferencing, such as accepted communication devices, welcoming messages and operational rules for conducting the collaboration conference. In general, any information that may be utilized by the CCRS to route a collaboration communication and conduct the collaboration conference may be stored in one or more databases associated with the CCRS.

The CCRS also includes a web server 406 or web application that utilizes one or more applications stored in an application server 408 to execute the one or more applications. For example, the web server 406 may include one or more application programming interfaces (APIs) that execute any number of stored applications to perform the operations described herein. The web server 406 may also enable the provisioning of the databases 404 of the CCRS by the application server 408. In addition, the CCRS may include a network interface unit 410 as a proxy for receiving any type of information and/or instructions from the network 102 to route the communication. The network interface unit 410 may also initiate one or more of the applications stored in the application server or database for execution by the CCRS and/or receive a request from the telecommunications network to initiate a collaboration conference.

Through the use of the described components, the CCRS 402 provides added flexibility and features to collaboration conferencing not previously available. For example, because each collaboration conference request is routed through the CCRS or system of CCRSs, routing rules may be applied to a block of related requesters identified by a master ID number or customer number, removing the need to update the routing rules for each member associated with the master ID or customer number. In addition, the database 404 of the CCRS 402 may maintain a control engine or state of a particular CCRS that determines which conference bridge a collaboration conference occurs. Thus, through the centralized nature of the CCRS 402 and the storage of customer and conference information, the CCRS provides flexibility in routing the collaboration conference requests.

Figure 3B:
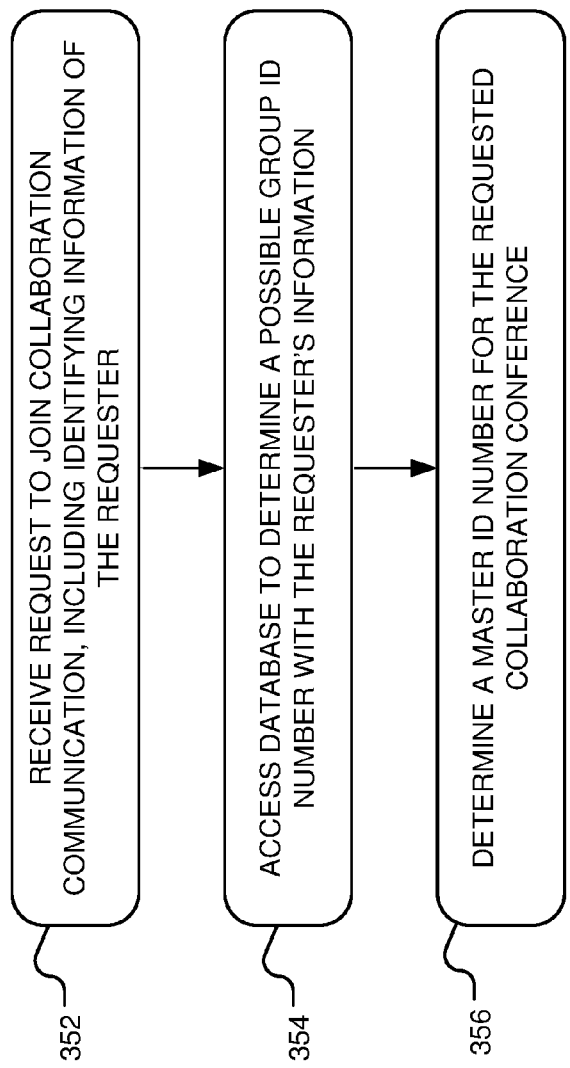
FIG. 3B is a flowchart illustrating a method for a central conferencing routing server to receive a request for a collaboration conference and associating a master identification number to the collaboration conference.

In operation, the CCRS 402 may perform the operations of the flowchart of FIG. 3B. In particular, the CCRS 402 receives a request to establish a collaboration conference at the network interface 410 in operation 352. The request may include information concerning the requestor, such as requestor's telephone number and access code number. However, although the operations of FIG. 3B are described in reference to the request comprising the requestor's telephone phone number and access code number, this is but one example of the information used by the CCRS to identify the requester. For example, the request may include an identification of the requester's communication device, such as a text string of the requester's personal computer. In another example, the requester's name and/or email address may be used as the identifier of the requester in the request. In yet another example, the SIP Uniform Resource Identifier (URI) may be used as the identifier. Thus, any operation described herein utilizing the requester's telephone number and access code may be applied to other information contained in the request. For ease of instruction, however, the example of the telephone number and access code number is used.

Upon receiving the request, the application server 408, in concert with the web server 406, utilizes the requestor's telephone number and access code number to possibly determine a group ID number for the requester in operation 354. In particular, with the requester's information, the application server 408 accesses a lookup table stored in the database 404 to match the telephone number and code access number to the group ID number. In some instances, it is advantageous to associate a group ID number to a group of users of the collaboration conference system. For example, through the group ID, one or more routing rules may be applied to the entire group without the need to provide a routing rule for each individual member of the group. In some instances, the group ID number may be associated with a customer ID number such that each member associated with a customer ID number is given the same group ID number and alterations to the customer's account with the network can be applied to each group member through alterations to routing rules associated with the group ID number. Other information concerning the requester, the network and/or the collaboration conference may also be retrieved by the application server 408.

In operation 356, the application server 356 may also associate a master ID reference or number to the collaboration conference request and stores the master ID reference or number in the database 404. The master ID reference or number is utilized by the network to track the collaboration conference and the participants to the conference and may be associated with the requester's information. With the master ID number associated with the request, the application server 408 again accesses the database 404 to determine a state of the collaboration conference. In general, if the collaboration conference has been established on a conference bridge (such that the requester is a participant to the collaboration conference and not the initiator), the database 404 includes an identification of the conference bridge on which the collaboration conferencing is hosted. Alternatively, if the request is to initiate a new collaboration conference, the database includes a notification the request is a request for a new collaboration conference, at which point the application server routes the request to a master CCRS device that executes a master control engine application to determine which conference bridge will host the conference. In this manner, the components of the CCRS 402 receive the request to join or initiate a collaboration conference and route the request to the proper conference bridge.

As mentioned above, the database 402 may include a subscriber information table 414 that associates information of the requester (such as a telephone number, access code number or other identification or reference of a requestor) to a group ID number for the CCRS system. Thus, several different requester references can be associated with the same group ID number, such as a customer number. In addition, one or more routing rules 412 can be associated with a group ID number in the database 402. For example, one routing rule 412 may restrict all collaboration conferences for a particular group ID number to a particular conference bridge. This removes the need to manually change the routing rules for each individual requester for all of the members of a particular group ID number. Further, the database 404 of the CCRS 402 may be utilized by a control engine 418 of the CCRS system to store information 416 utilized by the control engine, such as associating a master ID number of a collaboration conference with an ID of the conference bridge on which the conference is hosted, the status of a collaboration conference 420, the start time of the collaboration conference, the participant count of the conference, the maximum number of participants that have attended the particular conference, and the like. In general, the database 404 may include any information concerning collaboration conferences hosted by the telecommunications network.

Figure 5:
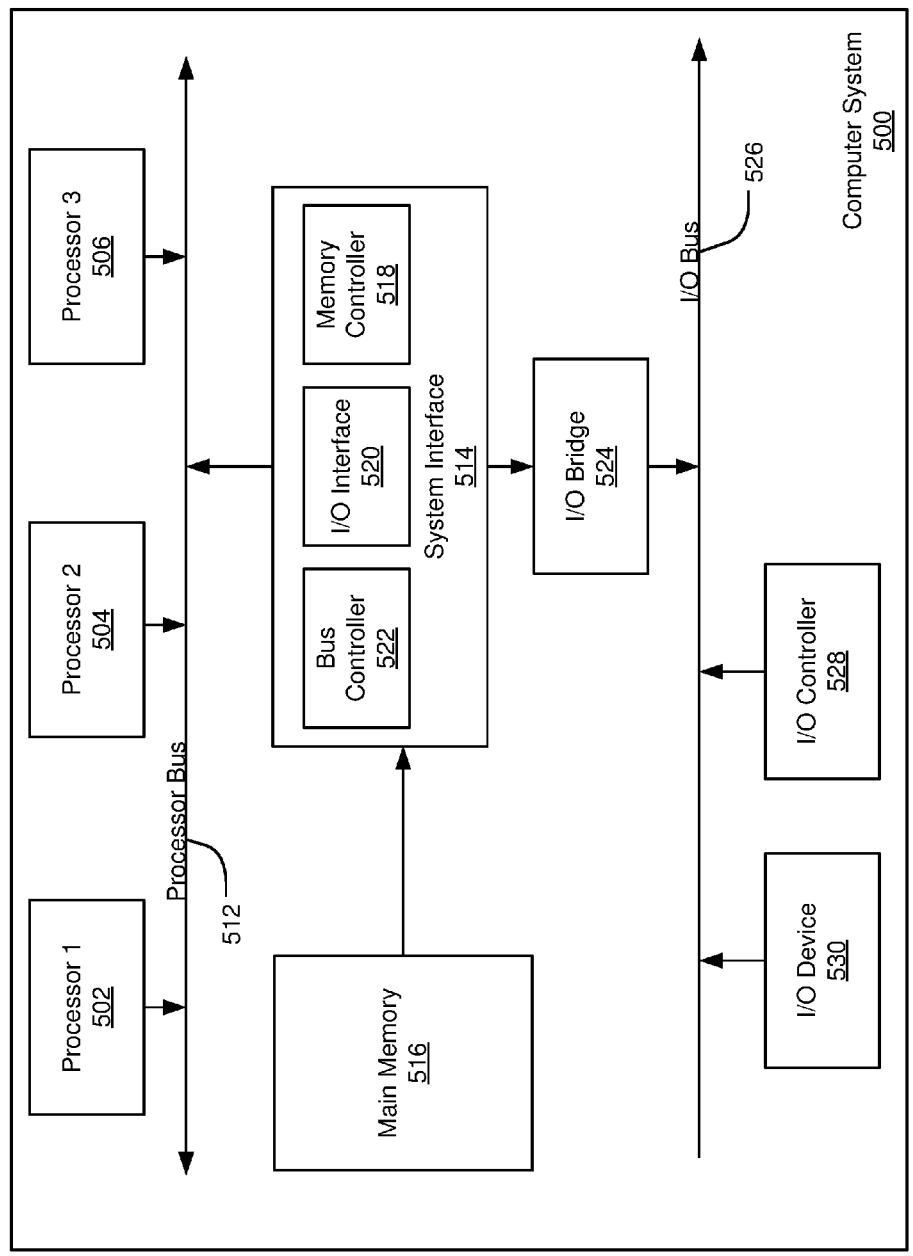
FIG. 5 is a diagram illustrating an example of a computing system which may be used in implementing embodiments of the present disclosure.

FIG. 5 is a block diagram illustrating an example of a computing device or computer system 500 which may be used in implementing embodiments of the present invention. The computer system (system) includes one or more processors 502-506. Processors 502-506 may include one or more internal levels of cache (not shown) and a bus controller or bus interface unit to direct interaction with the processor bus 512. Processor bus 512, also known as the host bus or the front side bus, may be used to couple the processors 502-506 with the system interface 514. Processors 502-506 may also be purpose built for processing/mixing media data, such as audio or video components of a media stream, such as a digital switch processor. System interface 514 may be connected to the processor bus 512 to interface other components of the system 500 with the processor bus 512. For example, system interface 514 may include a memory controller 515 for interfacing a main memory 516 with the processor bus 512. The main memory 516 typically includes one or more memory cards and a control circuit (not shown). System interface 514 may also include an input/output (I/O) interface 520 to interface one or more I/O bridges or I/O devices with the processor bus 512. One or more I/O controllers and/or I/O devices may be connected with the I/O bus 526, such as I/O controller 528 and I/O device 550, as illustrated.

I/O device 550 may also include an input device (not shown), such as an alphanumeric input device, including alphanumeric and other keys for communicating information and/or command selections to the processors 502-506. Another type of user input device includes cursor control, such as a mouse, a trackball, or cursor direction keys for communicating direction information and command selections to the processors 502-506 and for controlling cursor movement on the display device.

System 500 may include a dynamic storage device, referred to as main memory 516, or a random access memory (RAM) or other computer-readable devices coupled to the processor bus 512 for storing information and instructions to be executed by the processors 502-506. Main memory 516 also may be used for storing temporary variables or other intermediate information during execution of instructions by the processors 502-506. System 500 may include a read only memory (ROM) and/or other static storage device coupled to the processor bus 512 for storing static information and instructions for the processors 502-506. The system set forth in FIG. 5 is but one possible example of a computer system that may employ or be configured in accordance with aspects of the present disclosure.

According to one embodiment, the above techniques may be performed by computer system 500 in response to processor 504 executing one or more sequences of one or more instructions contained in main memory 516. These instructions may be read into main memory 516 from another machine-readable medium, such as a storage device. Execution of the sequences of instructions contained in main memory 516 may cause processors 502-506 to perform the process steps described herein. In alternative embodiments, circuitry may be used in place of or in combination with the software instructions. Thus, embodiments of the present disclosure may include both hardware and software components.

A machine readable medium includes any mechanism for storing information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 516. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

As described, by utilizing one or more of the embodiments described above, the CCRS system may route a collaboration conference communication to an appropriate conference bridge based on any number of preferences or information about the requester and/or communication network. In one example, the CCRS may employ one or more control or state engines that monitor or maintain a status of the collaboration conferences occurring over the network. The control engines maintain information about each collaboration conference, such as a master identification number for the conference, a status (such as active, inactive, temporary, or unknown), the conference bridge on which the conference is hosted, a start time for the conference, a participant count, a maximum participant count and a stop time for the conference, among other information. In general, the control engines may obtain or receive any information about the conference and maintain a record of the information for use by the CCRS system. As such, each control engine in the CCRS may be connected to or otherwise associated with the conference bridges associated with the communications network to provide and receive information concerning the collaboration conferences of the network. In one embodiment, the control engines may be an application executed by the application server 408 with the information or data stored in the database 404. The operation of the control engine in relation to the CCRS is described in more detail in U.S. Non-Provisional patent application Ser. No. 13/708,659 titled "METHOD FOR ROUTING IN A CENTRAL CONFERENCING ROUTING SERVER," which is hereby incorporated by reference herein.

The CCRS may utilize the information maintained by the control engines to perform several of the functions related to the routing of conference communications described above. For example, a request received by the CCRS to join an existing collaboration conference may be routed to the correct conference bridge by referring to the information stored by the control engines. As mentioned above, the control engines maintain a status of each conference and the conference bridge on which the conference occurs. With this information, the CCRS may appropriately route any additional participants to the correct conference bridge. Such information may also aid in routing requests for a new collaboration conference to a suitable conference bridge, including based on network performance and user preferences.

In one embodiment described above, the CCRS routes the conference request to a conference bridge by requesting the conference bridge for an available port on the bridge. If the conference request is a request to establish a collaboration conference, the request may be for a plurality of available ports to host the conference. The allocation of available ports associated with the conference bridge for hosting the conference may be handled by a request from the CCRS or by a control server associated with the conference bridge. In either case, available ports of the conference bridge may be made available in response to the conference request. In other embodiments, selection of a conference bridge may be accomplished using domain name system (DNS) resolution techniques, such as round-robin selection or intelligent algorithms that take into location and/or proximity considerations (e.g., Anycast™), load on the bridges, popularity or any other known policy. Such techniques may either replace or supplement the routing protocols as part of the conference bridge selection process.

As mentioned above, the CCRS system may include a plurality of CCRS devices or control engines executing on several application servers. As such, the network may determine a master control engine application to be executed on one of the CCRS devices that is tasked with routing new collaboration conference requests. In one embodiment, the master control engine may be determined by connection criteria. For example, each control engine of the CCRS devices may maintain a total number of bridges that are connected to all of the control engines with which the local control engine is communicating. In this embodiment, the control engine that sees the highest total number of bridges is selected as the master control engine and handles all collaboration conference requests. However, if more than one control engine sees the highest total number of bridge connections, the control engine with the highest number of local connections between the control engines with the highest total number is selected as the master control engine. If no single control engine is selected by the first two criteria, than a prioritized system ID may be employed to select the master control engine. It should be appreciated that this is but one example of a method for selecting the master control engine and any method to select a master control engine from the operating control engines may be employed. The use of a master control engine to determine to which conference bridge a new collaboration conference is established may aid in preventing a split conference being established on multiple bridges. Additionally, any control engine of the CCRS may act as the master control engine based on any criteria, including the example mentioned above. Some delay may be incorporated into the switching the master control engine from one engine to another to prevent bouncing from one engine to another rapidly.

In addition to the master control engine feature, the CCRS system may also incorporate a priority table or list into a decision process when determining which conference bridge to host the collaboration conference. The information or data within the priority table may be stored in one or more databases of the CCRS. In general, the priority list is associated with a customer number or other identifying number of a requester that lists one or more conference bridges that may host a collaboration conference and a priority associated with each conference bridge in the list. For example, the priority list for one customer may include three conference bridges ranked in order by the highest priority to the lower priority. In some embodiments, a plurality of conference bridges may be grouped into a single priority group. Upon receipt of a request for a collaboration conference, the master control engine may identify the requester, access the priority list associated with the requester and select a conference bridge based on the priority list. As discussed in more detail below, the priority of the conference bridges for any requester may be based on several criteria. The operation of the load balancing and priority routing in relation to the CCRS is described in more detail in U.S. Non-Provisional patent application Ser. No. 13/708,678 titled "LOAD BALANCING IN A CENTRAL CONFERENCING ROUTING SERVER," which is hereby incorporated by reference herein.

In one example of such criteria, one or more conference bridges may be assigned a higher priority based on the geographical location of the conference bridge. For various reasons, a conference bridge located in a particular area may be preferable for hosting a collaboration conference from a particular requester. For example, a conference bridge located nearer the requester may be preferable to one located a far distance as the connection speed and clarity may be improved for a conference bridge located nearer the requester. In this situation, the priority list for that requester may be updated or created to provide priority to the conference bridge near the requester such that, upon determining which conference bridge to host the collaboration conference, the master state engine may first consider the higher prioritized bridge.

Similarly, a higher priority may be given to a conference bridge that provides additionally requested features for the collaboration conference. For example, the customer to the network may request a collaboration conference occur in wideband audio or other features that require an IP-based conference bridge. In this situation, an IP-based conference bridge may be given a higher priority than non-IP-based conference bridges in an attempt to meet the requests of the requester. Other priority criteria may be the size or other network requirements of the conference. For example, a requester may routinely request a high volume conference such that the CCRS may associate a conference bridge that handles larger conferences (conferences with more participants) a higher priority for that particular requester. In general, however, any information or criteria may be considered when the CCRS prepares the priority list associated with a requester.

Another advantage that the priority list provides is in the situation when a conference bridge is placed offline or suffers a failure. For example, a scheduled maintenance on one of the conference bridges may be desired by a network administrator. Thus, conferences currently being hosted on the conference bridge for repair may be maintained by the CCRS, but new conferences may be directed to other conference bridges in an effort to remove the conferences from the selected conference bridge. To accomplish this, the CCRS may remove the selected conference bridge from the priority lists for each requester. Thus, when a request is received and the CCRS consults the priority list for the requester, the selected bridge is not an available option. However, the master state engine may continue to direct requests for ongoing conferences to the proper conference bridge. The operation of disaster recovery in relation to the CCRS is described in more detail in U.S. Non-Provisional patent application Ser. No. 13/708,689 titled "DISASTER RECOVERY WITH A CENTRAL CONFERENCING ROUTING SERVER," which are hereby incorporated by reference herein.

The CCRS may perform a similar operation when a conference bridge enters a failure state. In this situation, the failed bridge may be removed from the priority list for each requester. In addition, all requests received by the CCRS to join an existing conference may be sent to another conference bridge. However, this may create a situation where a conference is split between two conference bridges. In this situation, the CCRS may generate a notice to a network administrator of the potential for a split conference so that the administrator may direct each participant of the split conference to a single, operating conference bridge. In some embodiments, the recovery of a split conference into a united conference may be performed automatically by the CCRS upon detection. In addition, upon bringing the failed bridge back online, the CCRS may throttle the conferences placed on the bridge to prevent an overload of the bridge.

The CCRS system may also provide a dynamic routing option for requested collaboration conferences to balance the call load across the available conference bridges. For example, the state engines of the CCRS may request or receive information from each conference bridge associated with the network. Such information may include the number of active or used ports in the bridge and the overall capacity of the bridge. From this information, the state engines may determine a percent capacity available for each bridge. This information may be used to select a conference bridge to host the requested conference. For example, the conference bridge with the highest percentage of available ports may be selected by the master state engine for hosting the conference. However, it should be appreciated that the percent available information may be used in any manner to aid the master state engine in selecting a conference bridge.

In another embodiment, the load balancing may be utilized as a tie-breaker in conjunction with the priority list for a requester. For example, three conference bridges may be given the same priority in a requester's priority list, thereby belonging to the same priority group. To select which conference bridge in the priority group to host the requested conference, the CCRS may perform a load balancing to determine which bridge in the priority group has the most capacity. In this manner, the collaboration conferences may be dynamically hosted among the conference bridges to prevent overloading of one of the conference bridges.

The CCRS includes other features that may aid the network in transmitting collaboration conferences. For example, one embodiment of the CCRS may route an internet or web connection that is associated with the collaboration conference to the same conference bridge that hosts the conference to maintain continuity between the related web application and the conference. Further, the CCRS may maintain a list of technical capabilities of each conference bridge to ensure that particular technical requests are met. For example, one of the conference bridges may operate using SIP or another IP-type protocol. Such conference bridges provide additional technical features over traditional TDM based conference bridges, such as high definition audio, video and audio combination and the like. Thus, in response to a request for a collaboration conference to include particular technical features, the CCRS may route the collaboration conference to a conference bridge that supports the technical features of the conference.

In yet another example may include a conference lingering feature that maintains the status of each conference in the state engines for a specified amount of time to allow any changes or alterations to the requesters account to propagate to each conference bridge and state engine associated with the CCRS. Additionally, the CCRS may be configured to collect information about the conferences and store this information for analyze or use by the network and/or administrators of the network. For example, information on the number of participants associated with any conference may be maintained for future analysis to differentiate large conference users for future routing decisions.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. From the above description and drawings, it will be understood by those of ordinary skill in the art that the particular embodiments shown and described are for purposes of illustrations only and are not intended to limit the scope of the present invention. References to details of particular embodiments are not intended to limit the scope of the invention.

What is claimed is:

1. A method comprising:
   maintaining, by a computing device, a list of master identification numbers associated with a plurality of customers of a communications network;
   creating a priority list of conference bridges for a first customer of the plurality of customers;
   receiving, after creating the priority list for the first customer, a communication from a user associated with the first customer to establish a collaboration conference on a network; and
   in response to the receiving step:
      associating the user with a first master identification number from the list of master identification numbers;
      accessing the priority list;
      transmitting one or more requests for performance information from one or more conference bridges associated with the network;

analyzing the performance information from the one or more conference bridges associated with the network;

selecting a first conference bridge of the one or more conference bridges to host the collaboration conference event based at least on the priority list and the performance information; and automatically causing the collaboration conference to be initiated on the first conference bridge.

2. The method of claim 1 wherein the communication from the user of the communications network comprises a telephone number and an access code number.

3. The method of claim 1, further comprising:
maintaining at least one routing rule associated with the first master identification number.

4. The method of claim 3, further comprising:
selecting the first conference bridge based at least on the at least one routing rule.

5. The method of claim 1, wherein causing the collaboration conference to be initiated further comprises:
transmitting one or more routing messages to the communications network, wherein the one or more routing messages include an indication of the selected first conference bridge.

6. The method of claim 1 wherein the performance information from the one or more conference bridges associated with the network comprises an indicator of technical capabilities of the one or more conference bridges.

7. The method of claim 6 wherein at least one of the one or more conference bridges is a session initiation protocol (SIP) based telecommunication device.

8. The method of claim 1, wherein creating the priority list comprises ranking at least the first conference bridge and a second conference bridge based on at least one of: features provided by each conference bridge; and geographic location of each conference bridge.

9. The method of claim 1, wherein the priority list includes at least the first conference bridge and a second conference bridge, and the second conference bridge is a higher priority on the priority list, the method further comprising:
based on receiving the communication, determining that the second conference bridge is unavailable; and
removing the second conference bridge from the priority list prior to selecting the first conference bridge.

10. A system for selecting a conference bridge associated with a network for hosting a collaboration conference event, the system comprising:
a network interface unit configured to receive a communication from a user associated with a first customer of a plurality of customers of a communications network to establish the collaboration conference event on the network;
a processing device in communication with the network interface unit; and
a non-transitory computer-readable medium configured to maintain a list of master identification numbers associated with the plurality of customers of the communications network including at least a first master identification number associated with the first customer,
wherein the computer-readable medium is connected to the processing device and is configured to store information and instructions that, when executed by the processing device, performs the operations of:
creating a priority list of conference bridges for the first customer;

storing the priority list for the first customer prior to the network interface unit receiving the communication from the user;
associating the user with a first master identification number from the list of master identification numbers stored in the computer-readable medium;
transmitting one or more requests for performance information from one or more conference bridges associated with the network;
analyzing the performance information from the one or more conference bridges associated with the network;
selecting a first conference bridge of the one or more conference bridges associated with the network to host the collaboration conference event based at least on the priority list and the performance information; and
automatically causing the collaboration conference to be initiated on the first conference bridge.

11. The system of claim 10 wherein the communication from the user of the communications network comprises a telephone number and an access code number.

12. The system of claim 10 wherein the computer-readable medium maintains at least one routing rule associated with the first master identification number and wherein the processing device selects the first conference bridge based at least on the at least one routing rule.

13. The system of claim 10 wherein causing the collaboration conference to be initiated further comprises:
transmitting one or more routing messages to the communications network, wherein the one or more routing messages include an indication of the selected first conference bridge.

14. The system of claim 10 wherein the performance information from the one or more conference bridges associated with the network comprises an indicator of technical capabilities of the one or more conference bridges.

15. The system of claim 14 wherein at least one of the one or more conference bridges is a session initiation protocol (SIP) based telecommunication device.

16. The system of claim 10, wherein creating the priority list comprises ranking at least the first conference bridge and a second conference bridge based on at least one of: features provided by each conference bridge; and geographic location of each conference bridge.

17. The system of claim 10, wherein the priority list includes at least the first conference bridge and a second conference bridge, and the second conference bridge is a higher priority on the priority list, the operations further comprising:
based on receiving the communication, determining that the second conference bridge is unavailable; and
removing the second conference bridge from the priority list prior to selecting the first conference bridge.

18. A method comprising:
maintaining, by a computing device, a list of master identification numbers associated with a plurality of customers of a communications network, including at least a first master identification number for a first customer of the plurality of customers;
creating a priority list of conference bridges for the first customer, including at least a first conference bridge and a second conference bridge;
storing the priority list in association with the first master identification number;

receiving, after storing the priority list for the first customer, a communication from a user associated with the first customer to establish a collaboration conference on a network;

in response to the receiving step:

associating the user with the first master identification number;

accessing the priority list;

determining that the first conference bridge on the priority list is unavailable;

removing the first conference bridge from the priority list;

selecting the second conference bridge of the one or more conference bridges to host the collaboration conference event based at least on the priority list; and automatically causing the collaboration conference to be initiated on the second conference bridge.

19. The method of claim 18, wherein creating the priority list comprises ranking at least the first conference bridge and the second conference bridge based on at least one of: features provided by each conference bridge; volume capabilities of each conference bridge; and geographic location of each conference bridge.

20. The method of claim 18, further comprising:

maintaining at least one routing rule associated with the first master identification number.

* * * * *